No. 666,163. Patented Jan. 15, 1901.
J. & W. TITUS.
PULLEY SYSTEM FOR CONVEYER BELTS, &c.
(Application filed May 22, 1900.)

(No Model.)

WITNESSES:

INVENTORS
John Titus
William Titus
BY
James A. Whitney
ATTORNEY

UNITED STATES PATENT OFFICE.

JOHN TITUS, OF OYSTER BAY, AND WILLIAM TITUS, OF NORTH HEMPSTEAD, NEW YORK.

PULLEY SYSTEM FOR CONVEYER-BELTS, &c.

SPECIFICATION forming part of Letters Patent No. 666,163, dated January 15, 1901.

Application filed May 22, 1900. Serial No. 17,541. (No model.)

*To all whom it may concern:*

Be it known that we, JOHN TITUS, residing at Oyster Bay, and WILLIAM TITUS, residing in Old Westbury, in the town of North Hempstead, in the county of Nassau and State of New York, citizens of the United States, have invented certain new and useful Improvements in Pulley Systems for Conveyer-Belts, &c.; and we do hereby declare that the following is a full, clear, and exact description of the same, reference being had to the accompanying drawings, making a part of this specification, in which—

Figure 1:
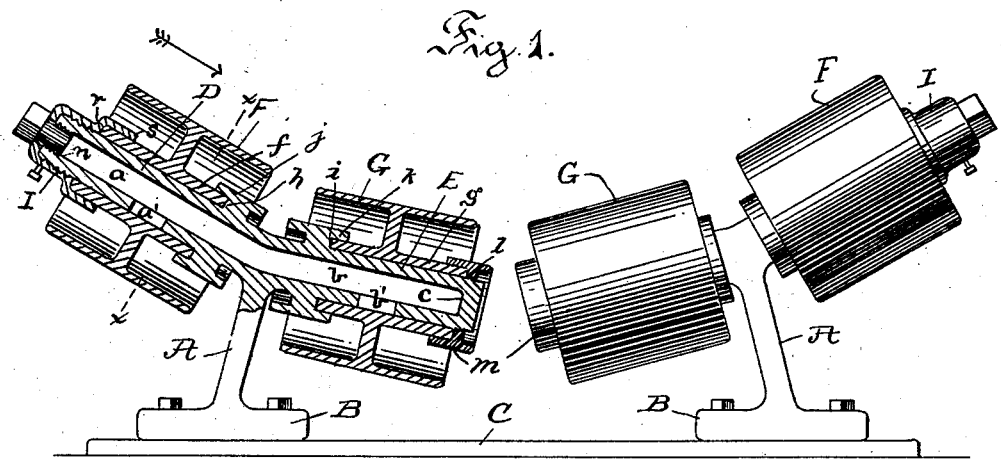
Figure 2:
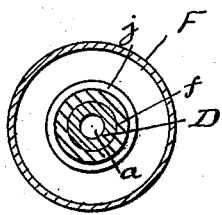

Figure 1 is a side view and partial vertical sectional view of an apparatus embracing our invention. Fig. 2 is a transverse sectional view taken on the line $x$ $x$ of Fig. 1.

This invention concerns that class of apparatus used for conveying sand, gravel, &c., from one location to another by means of an endless belt or apron which is carried by systems of pulleys or rollers so arranged as to provide a concave or trough-like cross-section to the apron the better to retain the materials therein.

The invention relates to that variety of such mechanisms in which four or more carrier-pulleys act in concert in providing this trough-like section to the apron; and its objects are to simplify such structures, to provide for the more efficient lubrication of the pulleys upon their bearings, and to prevent access of sand, grit, and the like to the lubricated surfaces, and thereby prevent their premature destruction by undue abrasion of the wearing-surfaces.

Our invention comprises certain novel combinations of parts whereby these objects are effectually attained.

When in working order, an apparatus constructed according to our invention comprises two parts which are duplicates of each other and arranged opposite each other, the one part giving shape to one lateral portion of the belt, while the other in like manner gives shape to the other lateral portion of the belt. The description of the one part therefore is also a sufficient description of the other.

A is a standard which by means of a suitable foot B is made fast to and supported by any appropriate base C. This standard carries two fixed journals D and E, each of which carries a pulley, as presently explained, and each of which is arranged at an angle to the horizontal corresponding to the desired angle of the pulley carried thereby. The two journals are tubular, their bores $a$ $b$ being continuous the one with the other. The bore $b$ of the lower pulley is closed at its lower end, as at $c$. The bores of these journals have lateral outlet-openings $a'$ and $b'$, respectively. The pulleys F and G are placed upon the journals D and E, respectively, the hub of the pulley F being indicated by the reference-letter $f$ and that of the pulley G by the reference-letter $g$. Placed opposite each other near the junction of the two journals and fast upon the latter are two fillets $h$ and $i$. The lower end of the hub $f$ of the pulley F abuts against the fillet $h$, which receives the downward thrust of said hub, while the upper end of the hub $g$ of the pulley G is in such relation with the fillet $i$ that the latter limits any upward movement of the said hub. Fast upon the fillet $h$ and when preferred integral therewith is a collar $j$, which extends over and surrounds the adjacent lower end of the hub of the pulley F. In like manner a similar collar $k$ is provided to the fillet $i$ and extends over and around the adjacent upper end of the hub of the pulley G. Fast upon the lower or outer end of the lower journal E is a fillet $l$, which carries a collar $m$, which extends over and around the adjacent lower end portion of the hub $g$ of the pulley G. The fillet $l$, with its collar $m$, is removable to permit the placing of the pulley G upon its journal E. The fillet, with its collar, may be held in place by screw-threads or any other suitable device. The upper end of the journal D projects beyond the hub of the pulley F and has fast upon it a cap I, which has an inlet-opening $n$, which is coincident with the bore of the journal D, and also a shoulder $r$, which abuts against the end of the said hub to prevent its displacement in an outward or upward direction. The inlet-opening of the cap may be closed by a plug or other device when desired. Provided to the cap and preferably integral therewith is a flange $s$, which extends over and around the adjacent end portion of the hub of the said pulley F. The cap, with its flange, is detachable in order that the hub of the pulley F may be slipped upon or removed from its journal. The cap may be held in place upon the journal by a key or any other suitable device. When desired, an ordinary lubricator-wick may be placed in the bores of the two journals.

In the operation of the apparatus any suitable lubricating material is placed in the bore $a$ through the inlet $n$ and passes therein also into the bore $b$, the lubricant in due time making its way through the openings $a'$ and $b'$ between the outer surfaces of the journals and the inner surfaces of the bores of the pulley-hubs. Meanwhile the collars $j$, $k$, and $l$ and the flange $r$ exclude sand, grit, &c., from between the journals and the bores of the hubs, and thereby prevent deterioration of the lubricant from the bores of the hubs and also prevent abrasion and cutting of the wearing contact-surfaces of the journals and the hubs. Further, as the journals may be made of cast metal integral with each other and with their standard the same may be very economically made and are rendered firm and substantial in structure and operation.

What we claim as our invention is—

The combination with a standard provided with two tubular inclined journals extended in opposite directions, the bores of which are continuous, closed at the lower end and having lateral outlet-openings, of pulleys on the said journals, a detachable fillet fast on the lower end of the lower journal and a collar on said fillet extended upon and around the adjacent end of the hub of the lower pulley, a fillet fast on the upper part of the lower journal and having a collar extended upon and around the upper part of the hub of the said lower pulley, a fillet fast upon the lower part of the upper journal and having a collar extended upon and around the adjacent lower part of the hub of the upper pulley, and a cap fast upon the projected upper end of the upper journal, having an inlet-opening coincident with the bore of said journal and a shouldered flange which extends over and around the adjacent upper part of the hub of the upper pulley, all substantially as herein set forth.

JOHN TITUS.
WILLIAM TITUS.

Witnesses:
ERNEST D. TATUM,
ANDREW DURYEA.